(12) United States Patent
Li et al.

(10) Patent No.: US 8,094,567 B2
(45) Date of Patent: Jan. 10, 2012

(54) METHOD FOR TRANSFERRING TEST MESSAGES AND NETWORK ELEMENT DEVICE

(75) Inventors: Feng Li, Shenzhen (CN); Fang Yin, Shenzhen (CN); Liusheng Xu, Shenzhen (CN); Zhenwei Chen, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 150 days.

(21) Appl. No.: 12/428,250

(22) Filed: Apr. 22, 2009

(65) Prior Publication Data

US 2009/0201943 A1 Aug. 13, 2009

Related U.S. Application Data

(63) Continuation of application No. PCT/CN2007/071073, filed on Nov. 16, 2007.

(30) Foreign Application Priority Data

Jan. 6, 2007 (CN) .......................... 2007 1 0072903

(51) Int. Cl.
    *H04L 1/00* (2006.01)
(52) U.S. Cl. .................................... 370/241.1
(58) Field of Classification Search ............... 370/241.1, 370/242–248
    See application file for complete search history.

(56) References Cited

U.S. PATENT DOCUMENTS

| | | | |
|---|---|---|---|
| 7,080,160 B2 * | 7/2006 | Cognet et al. ................ | 709/248 |
| 7,652,983 B1 * | 1/2010 | Li et al. ........................ | 370/217 |
| 7,773,593 B2 * | 8/2010 | Krzanowski .................. | 370/389 |
| 2002/0081971 A1 * | 6/2002 | Travostino ..................... | 455/41 |
| 2002/0109879 A1 | 8/2002 | Wing So | |

(Continued)

FOREIGN PATENT DOCUMENTS

CN 1547337 A 11/2004

(Continued)

OTHER PUBLICATIONS

Lang, J et al. "Link Management Protocol" IETF Standard, Internet Engineering Task Force. Oct. 1, 2005.

(Continued)

*Primary Examiner* — Kwang B Yao
*Assistant Examiner* — Juvena Loo
(74) *Attorney, Agent, or Firm* — Brinks Hofer Gilson & Lione

(57) ABSTRACT

A method for transferring test messages includes a Network Element (NE) A and NE B negotiating and determining a logical channel type. The Link Management Protocol (LMP) entity of NE A constructs a test message packet which includes the local Ethernet data interface ID, and transfers the test message packet to the local packet control module. The packet control module of NE A encapsulates the test message packet according to the logical channel type determined through negotiation, and transfers the encapsulated packet to the local transmitting interface. The receiving interface of NE B identifies and receives the packet. The packet control module of NE B obtains the packet from the local receiving interface and then encapsulates the packet. Next the packet control module of NE B transfers the test message packet obtained after decapsulation to the local LMP entity. Therefore, the test message can be transferred on the Ethernet data interface, and the auto discovery of the Ethernet physical link of the NE device succeeds once the test message is transferred successfully.

12 Claims, 5 Drawing Sheets

U.S. PATENT DOCUMENTS

| | | | |
|---|---|---|---|
| 2003/0093804 A1* | 5/2003 | Chang et al. | 725/95 |
| 2003/0158948 A1* | 8/2003 | Walsh | 709/228 |
| 2004/0165595 A1* | 8/2004 | Holmgren et al. | 370/395.3 |
| 2004/0190905 A1* | 9/2004 | Kano | 398/141 |
| 2007/0081471 A1* | 4/2007 | Talley et al. | 370/252 |
| 2007/0086455 A1* | 4/2007 | Allan et al. | 370/389 |
| 2008/0117827 A1* | 5/2008 | Matsumoto et al. | 370/244 |
| 2010/0046504 A1* | 2/2010 | Hill | 370/352 |

FOREIGN PATENT DOCUMENTS

| | | |
|---|---|---|
| CN | 1622547 A | 6/2005 |
| CN | 1764320 A | 4/2006 |

OTHER PUBLICATIONS

Fedyk, Don et al. "GMPLS Control of Ethernet; draft-fedyk-gmpls-ethernet-pbt-01.txt" IETF Standard-Working-Draft, Internet Engineering Task Force, IETF, No. 1: Oct. 1, 2006.

Supplementary European Search Report issued in corresponding European Patent Application No. 07 81 7263; issued Sep. 11, 2009.

Written Opinion of the International Searching Authority issued in corresponding PCT Patent Application No. PCT/CN2007/071073, mailed Mar. 6, 2008.

Lang et al., "Link Management Protocol (LMP)" Network Working Group. The Internet Society, Oct. 2005.

Lang et al., "Synchronous Optical Network (Sonet)/Synchronous Digital Hierarchy (SDH) Encoding for Link Management Protocol (LMP) Test Messages", Network Working Group. The Internet Society, Oct. 2005.

Fredette et al., "Link Management Protocol (LMP) for Dense Wavelength Division Multiplexing (DWDM) Optical Line Systems", Network Working Group. The Internet Society, Oct. 2005.

\* cited by examiner

METHOD FOR TRANSFERRING TEST MESSAGES AND NETWORK ELEMENT DEVICE

This application is a continuation of International Application No. PCT/CN2007/071073 filed on Nov. 16, 2007, which claims priority to Chinese Patent Application No. 200710072903.0, filed with the Chinese Patent Office on Jan. 6, 2007, both of which are incorporated herein by reference in their entireties.

FIELD OF THE DISCLOSURE

The present disclosure relates to network communication technologies, and in particular, to a method for transferring test messages in the optical transport network technology field, and to a Network Element (NE) device for sending and receiving test messages.

BACKGROUND

Automatically Switched Optical Network (ASON) is a new-generation optical transport network which implements the optical network switching connection function automatically in an intelligent way. In order to implement the automatic switching connection function, the ASON needs to have basic functions, including automatic resource discovery (for example, neighbor discovery, topology discovery, and service discovery), routing function, and signaling function.

In the ASON, when the optical network switching connection is configured through the Generalized Multi-Protocol Label Switching (GMPLS) signaling mechanism, the following circumstances occur:

In the case that the core network adopts the full optical switching equipment massively, precise fault locating is difficult if no automatic optical/non-optical monitoring capability is available. When the number of fiber links between adjacent NEs increases, the routing protocol is unable to perform link attribute notification for such numerous data links. For the numerous fiber links, the adjacent NEs are unable to identify the links correctly in the case of non-manual configuration; and the management on local links is inconsistent with the management on remote links. The foregoing contents are about ASON resource management. Therefore, the standardization organization has formulated a Link Management Protocol (LMP) for link resource management.

The existing LMP supports Synchronous Digital Hierarchy (SDH) interfaces. For SDH interfaces, test messages are transferred through the logical channels provided by the overhead bytes in the SDH frame. That is, the LMP entity of the transmitter NE constructs a test message packet. The packet includes 16 bytes regularly, and extra bytes are input as 0s. The 16-byte test messages are inserted cyclically into the J0 overhead bytes of an SDH frame through a lower-layer driver, and SDH frames are sent. The receiver NE extracts J0 overhead bytes according to the 16 received J0 SDH frames, makes the 16 extracted J0 overhead bytes into a 16-byte test message packet, and sends the test message packet to the LMP entity of the receiver NE through the lower-layer driver.

The solution under the prior art only deals with transferring the test messages through an SDH interface so that the LMP can support auto discovery of SDH links of the data plane. However, because the control plane of the Transport MPLS Multiprotocol Label Switching (TMPLS)/Provider Backbone Transport (PBT) network uses the GMPLS, the data plane of the TMPLS/PBT transport network uses the Ethernet data interface widely. No solution is currently available to support auto discovery of the Ethernet physical links. That is, the technical solution to transferring test messages on the Ethernet data interface is pending.

SUMMARY

In view of the above, the technical solution under the present disclosure is implemented in following way.

A method for transferring test messages where the first NE is connected with the second NE through an Ethernet physical link includes:

negotiating and selecting, by the first NE and the second NE, a logical channel type;

constructing, by an LMP entity of the first NE, a test message packet which includes an Ethernet data interface ID of the first NE, and transferring the test message packet to the packet control module of the first NE;

encapsulating, by the packet control module of the first NE, the test message packet according to the logical channel type determined through negotiation, and transferring the encapsulated packet which carries the test message packet to the transmitting interface corresponding to the Ethernet data interface ID of the first NE;

identifying and receiving, by the receiving interface of the second NE connected with the Ethernet physical link, the packet;

obtaining, by the packet control module of the second NE, the packet from the receiving interface of the second NE, and decapsulating the packet; and transferring, by the packet control module of the second NE, the test message packet obtained after decapsulation to the LMP entity of the second NE.

A method for transferring test messages where the first NE is connected with the second NE through an Ethernet physical link and when the first NE negotiates with the second NE to provide a logical channel in the protocol stack mode, includes:

constructing, by the LMP entity of the first NE, a test message packet which includes an Ethernet data interface ID of the first NE, and transferring the test message packet to the packet control module of the first NE;

encapsulating, by the packet control module of the first NE, the test message packet into a protocol stack packet which carries the test message packet by using the IP protocol stack function according to the logical channel type of the protocol stack mode, and transferring the protocol stack packet to the PPP interface corresponding to the Ethernet data interface ID of the first NE;

identifying and receiving, by the PPP interface of the second NE connected with the Ethernet physical link, the protocol stack packet;

obtaining, by the packet control module of the second NE, the protocol stack packet from the PPP interface of the second NE by using the IP protocol stack function, and decapsulating the packet; and transferring, by the packet control module of the second NE, the test message packet obtained after decapsulation to the LMP entity of the second NE.

A method for transferring test messages where the first NE is connected with the second NE through an Ethernet physical link and when the first NE negotiates with the second NE to provide a logical channel in the VLAN mode, includes:

constructing, by the LMP entity of the first NE, a test message packet which includes an Ethernet data interface ID of the first NE, and transferring the test message packet to the packet control module of the first NE;

encapsulating, by the packet control module of the first NE, the test message packet into an Ethernet MAC frame which carries a VLAN tag and the test message packet according to the logical channel type of the VLAN mode, and invoking a data plane to transfer the Ethernet MAC frame to an optical/electrical interface corresponding to the Ethernet data interface ID of the first NE;

identifying and receiving, by the optical/electrical interface of the second NE connected with the Ethernet physical link, the Ethernet MAC frame through the VLAN tag;

obtaining, by the packet control module of the second NE, the Ethernet MAC frame from the optical/electrical interface of the second NE by invoking the data plane, and decapsulating the frame; and transferring, by the packet control module of the second NE, the test message packet obtained after decapsulation to the LMP entity of the second NE.

A method for transferring test messages where the first NE is connected with the second NE through an Ethernet physical link and when the first NE negotiates with the second NE to provide a logical channel in the special MAC address mode, includes:

constructing, by the LMP entity of the first NE, a test message packet which includes an Ethernet data interface ID of the first NE, and transferring the test message packet to the packet control module of the first NE;

encapsulating, by the packet control module of the first NE, the test message packet into an Ethernet MAC frame which uses a special multicast MAC address as a destination MAC address and carries the test message packet according to the logical channel type of the special MAC address mode, and invoking a data plane to transfer the Ethernet MAC frame to an optical/electrical interface corresponding to the Ethernet data interface ID of the first NE;

identifying and receiving, by the optical/electrical interface of the second NE connected with the Ethernet physical link, the Ethernet MAC frame through the special multicast MAC address;

obtaining, by the packet control module of the second NE, the Ethernet MAC frame from the optical/electrical interface of the second NE by invoking the data plane, and decapsulating the frame; and transferring, by the packet control module of the second NE, the test message packet obtained after decapsulation to the LMP entity of the second NE.

An NE device provided includes:

an LMP entity, adapted to: negotiate and select a logical channel type; construct a test message packet which carries a local Ethernet data interface ID, and send the test message packet to the packet control module; and receive the test message packet obtained after decapsulation from the packet control module;

a packet control module, adapted to: receive the test message packet from the LMP entity, encapsulate the test message packet according to the logical channel type determined through negotiation, and send the encapsulated packet which carries the test message packet to the interface module corresponding to the local Ethernet data interface ID; obtain the packet from the interface module, and decapsulate the packet to obtain the test message packet; and an interface module, adapted to: receive the packet from the packet control module, and send the packet to the outside; and identify and receive the packet from the outside.

Therefore, the technical solution under the prior art transfers the test message only through an SDH interface. In the embodiments of the present disclosure, the LMP entity supports the negotiation mechanism, and may select the type of the logical channel, for example, logical channel of the protocol stack mode, logical channel of the VLAN mode, and logical channel of the special MAC address mode; the packet control module of the NE device encapsulates the test message packet according to the logical channel type determined through negotiation. Therefore, the test message can be transferred on the Ethernet data interface, and the auto discovery of the Ethernet physical link of the NE device succeeds once the test message is transferred successfully. Moreover, the foregoing types of logical channels may be negotiated according to the actual application conditions, and the available logical channel may be selected flexibly so that the test message may be transferred between the NE devices more conveniently.

BRIEF DESCRIPTION OF THE DRAWINGS

The accompanying drawings are intended for better understanding of the present disclosure and constitute part of this application rather than limitation to the present disclosure.

DETAILED DESCRIPTION

In order to make the present disclosure clearer to those skilled in the art, the embodiments of present disclosure are described below by reference to accompanying drawings. The exemplary embodiments of the present disclosure and description thereof are intended for interpreting rather than limiting the present disclosure.

Embodiment 1

Figure 1:
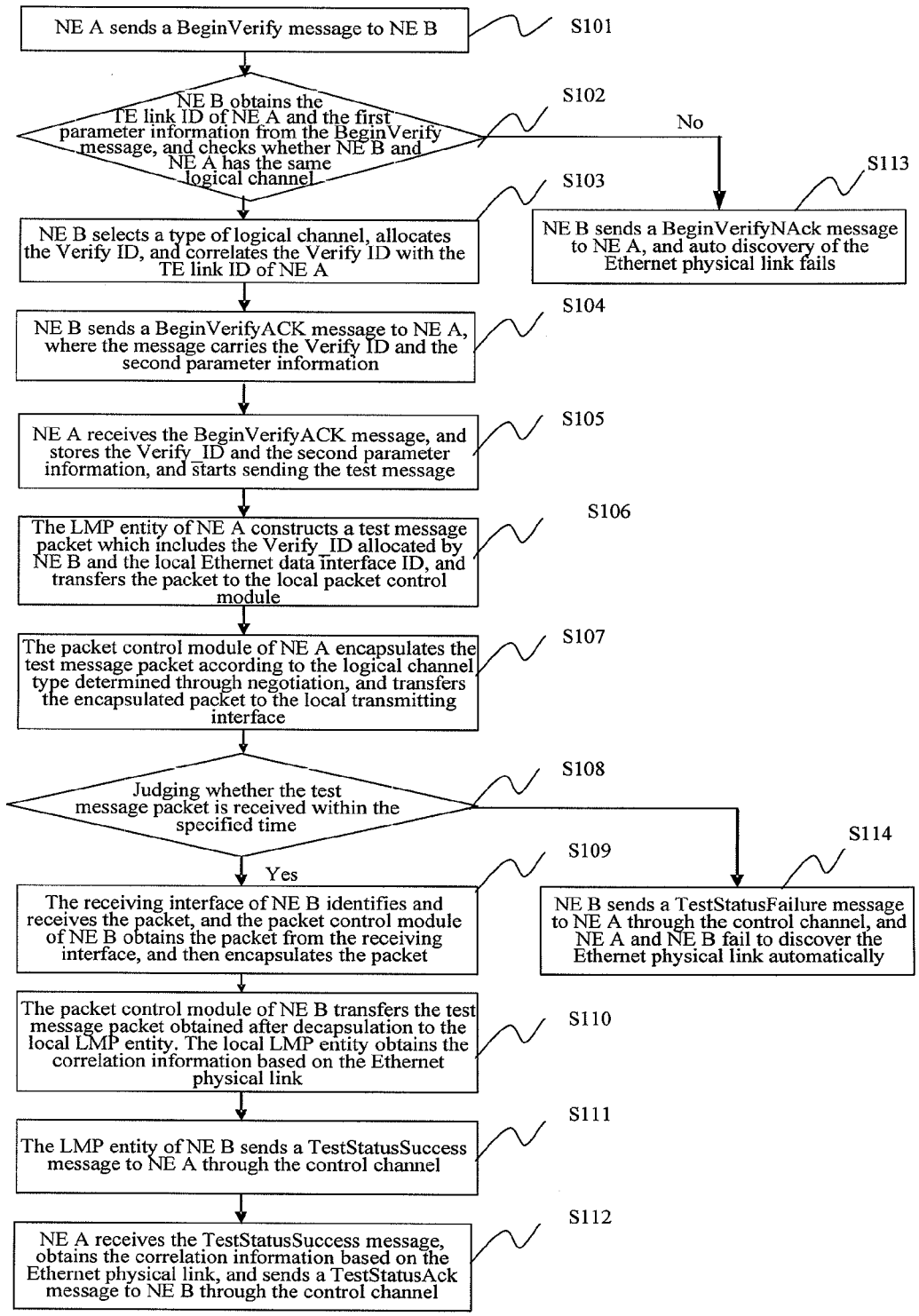
FIG. 1 is a flowchart of a method for transferring test messages in the first embodiment of the present disclosure.

The method for transferring test messages on the Ethernet data interface of the point-to-point physical link connection is detailed in embodiment 1. It is worthy of attention that for a TMPLS/PBT transport network, the Ethernet data interface is generally of the unnumbered interface type, namely, the interface type without IP address. Besides, the method provided in this embodiment is also applicable to the numbered interface type. FIG. 1 is a flowchart of a method for transferring test messages in the first embodiment of the present disclosure.

S101: NE A sends a BeginVerify message to NE B through the control channel. The message carries the TE link ID of NE A and the first parameter information, where the first parameter information includes the NE A logical channel type which supports transfer of test messages, and the frequency of sending test messages.

S102: NE B receives the BeginVerify message, obtains the TE link ID of NE A and the first parameter information, and judges whether the NE B itself has the logical channel type identical to the NE A logical channel type which supports transfer of test messages. If such is the case, the process proceeds with step S103; otherwise, the process proceeds with S113, where the NE B sends a BeginVerifyNAck message carrying error information to NE A through the control channel, and at this time, the auto discovery of the Ethernet physical link fails.

S103: NE B selects one of the logical channel types, and allocates a verification ID (hereinafter referred to as "Verify_ID"), correlates the Verify_ID with the TE link ID of NE A, and saves the correlation information and the logical channel type information.

S104: NE B sends a BeginVerifyAck message to NE A through the control channel. The message carries the Verify_ID and the second parameter information, where the second parameter information includes the logical channel type which is selected by the NE B and supports transfer of test messages, and the time range set for NE B to receive test messages.

S105: After receiving the BeginVerifyAck message, NE A saves the VerifyID and the second parameter information carried in the BeginVerifyAck message, and starts sending test messages.

S106: The LMP entity of NE A constructs a test message packet which includes the Verify_ID allocated by NE B and the local Ethernet data interface ID, and transfers the test message packet to the local packet control module.

S107: The NE A packet control module encapsulates the test message packet according to the different logical channel type selected through negotiation between NE A and NE B, and transfers the encapsulated packet which carries the test message packet to the transmitting interface corresponding to the local Ethernet data interface ID, and the Ethernet physical link connected with the transmitting interface transfers the packet.

S108: A judgment is made about whether the test message packet is received in the specified time. If such is the case, the process proceeds with step S109; otherwise, the process proceeds with step S114, where NE B sends a TestStatusFailure message to NE A through the control channel, and at this time, the NE A and NE B fail to discover the Ethernet physical link automatically.

S109: The receiving interface of NE B connected with the Ethernet physical link identifies that the packet carries the test message packet, and receives the packet. The NE B packet control module obtains the packet from the receiving interface of NE B, and decapsulates the packet.

S110: The packet control module of NE B transfers the test message packet obtained after decapsulation to the local LMP entity. The local LMP entity obtains the corresponding local TE link ID and the local Ethernet data interface ID according to the receiving interface which receives the packet, extracts the Verify_ID and the NE A Ethernet data interface ID from the test message packet obtained after decapsulation, correlates the local TE link ID with the TE link ID of NE A according to the stored information about correlation between the Verify_ID and the TE link ID of NE A, correlates the local Ethernet data interface ID with the Ethernet data interface ID of NE A, and stores the correlation information. At this time, NE B has obtained the information about the local NE and NE A based on the Ethernet physical link.

S111: The LMP entity of NE B sends a TestStatusSuccess message to NE A through the control channel, where the message carries the Verify_ID, TE link ID of NE B, Ethernet data interface ID of NE B, and Ethernet data interface ID of NE A.

S112: After receiving the TestStatusSuccess message, NE A obtains the correlated local TE link ID, local Ethernet data interface ID, TE link ID of NE B, and Ethernet data interface ID of NE B based on the Ethernet physical link, and then sends a TestStatusAck message to NE B through the control channel.

It is worthy of further attention that as regards which logical channel is selected by NE A and NE B through negotiation for transferring test messages, this embodiment newly defines the BEGIN_VERIFY object in the parameter information carried in the negotiation message. The value of the "EncType" field of the object is the Ethernet type, and the "Verify Transport Mechanism" field of the object defines four bit values. The BEGIN_VERIFY object is detailed below:

```
BEGIN_VERIFY object
Class = 8
C-TYPE = 1
   0 1 2 3 4 5 6 7 8 9 0 1 2 3 4 5 6 7 8 9 0 1 2 3 4 5 6 7 8 9 0 1
  +-+-+-+-+-+-+-+-+-+-+-+-+-+-+-+-+-+-+-+-+-+-+-+-+-+-+-+-+-+-+-+-+
  |       Flags           |              VerifyInterval            |
  +-+-+-+-+-+-+-+-+-+-+-+-+-+-+-+-+-+-+-+-+-+-+-+-+-+-+-+-+-+-+-+-+
  |                     Number of Data Links                       |
  +-+-+-+-+-+-+-+-+-+-+-+-+-+-+-+-+-+-+-+-+-+-+-+-+-+-+-+-+-+-+-+-+
  |    EncType    |   (Reserved)   |   Verify Transport Mechanism  |
  +-+-+-+-+-+-+-+-+-+-+-+-+-+-+-+-+-+-+-+-+-+-+-+-+-+-+-+-+-+-+-+-+
  |                       TransmissionRate                         |
  +-+-+-+-+-+-+-+-+-+-+-+-+-+-+-+-+-+-+-+-+-+-+-+-+-+-+-+-+-+-+-+-+
  |                          Wavelength                            |
  +-+-+-+-+-+-+-+-+-+-+-+-+-+-+-+-+-+-+-+-+-+-+-+-+-+-+-+-+-+-+-+-+
```

EncType: code type. If the value of this field "2", this field indicates Ethernet; and Verify Transport Mechanism: logical channel mechanism, and occupying four bits. The value of each bit is user-definable, and each different bit value indicates the supported logical channel type.

Example

0x0001: reserved for other types of logical channels;

0x0002: This logical channel supports the protocol stack mode;

0x0004: This logical channel supports the VLAN mode; and

0x0008: This logical channel supports the special MAC address mode.

Therefore, the types of logical channels include: protocol stack mode, VLAN mode, and special MAC address mode. Each different logical channel type decides a different encapsulation format and transfer mode of the test message packet.

Embodiment 1 elaborates the method for transferring test messages on the Ethernet data interface after selecting a different type of logical channel through negotiation. The auto discovery of the Ethernet physical link of the NE device succeeds once the test message is transferred successfully. The method of the LMP entity transferring test messages on the Ethernet data interface is detailed below, taking the logical channel of the protocol stack mode, VLAN mode, and special MAC address mode as examples.

Embodiment 2

Embodiment 2 is detailed below, supposing that the logical channel is provided in the protocol stack mode.

The protocol stack mode is subdivided into User Datagram Protocol (UDP) mode and Transmission Control Protocol (TCP) mode. The protocol stack mode needs support of the Internet Protocol (IP) protocol stack, uses the IP protocol stack to encapsulate the corresponding packet, and uses the IP protocol stack to create a Point-to-Point Protocol (PPP) interface corresponding to each Ethernet data interface in order to implement transfer of test message packets to the PPP interface. In this case, for each Ethernet data interface: (1) The optical/electrical interface IDs correspond to and are mutually convertible to the Ethernet data interface IDs; and (2) the optical/electrical interface IDs correspond to and are mutually convertible to the PPP interface IDs.

Figure 2:
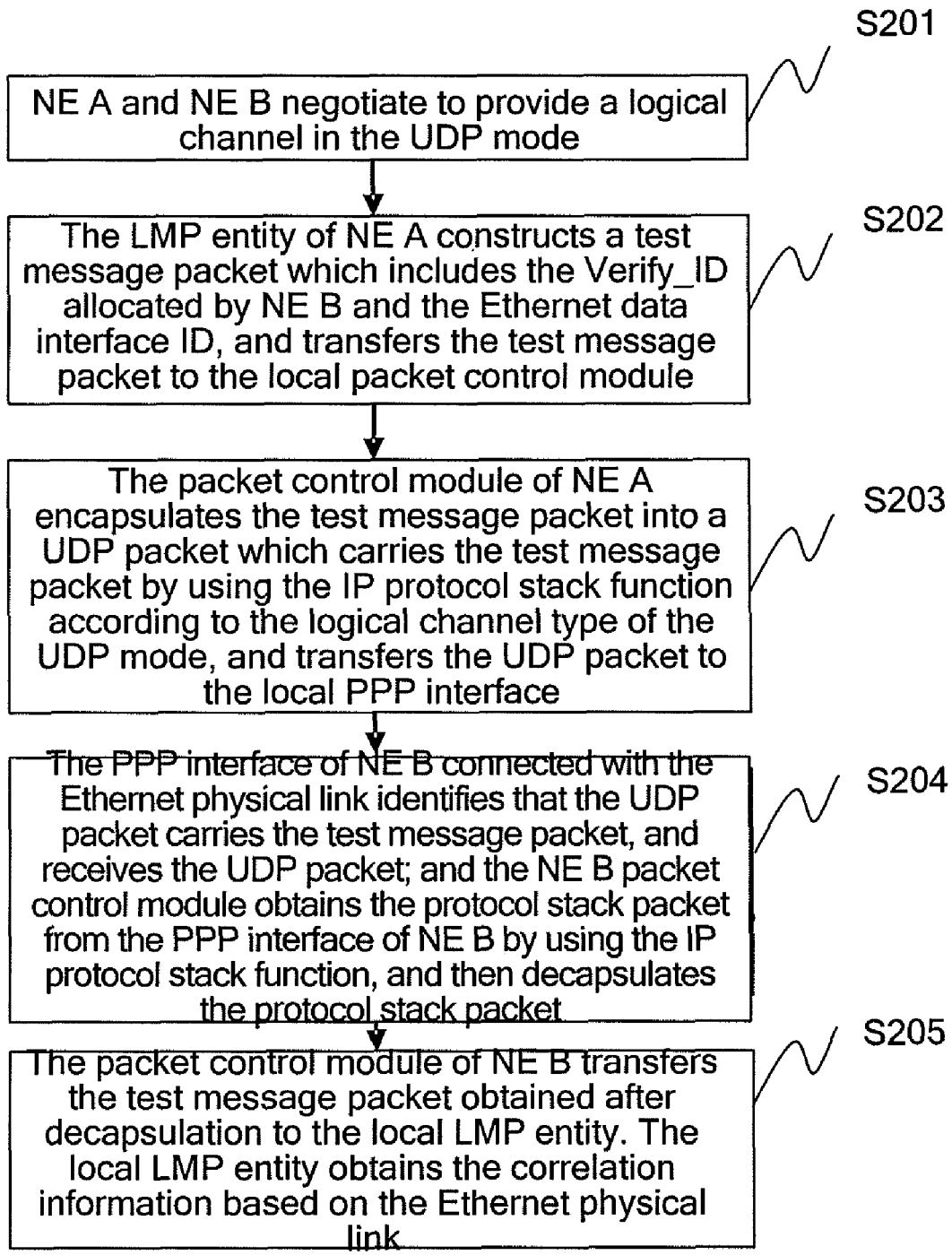
FIG. 2 is another flowchart of a method for transferring test messages in the second embodiment of the present disclosure.

Taking the UDP mode as an example, the method for transferring test messages is detailed below. FIG. 2 is a flowchart of another method for transferring test messages in the second embodiment of the present disclosure.

S201: NE A and NE B negotiate to provide a logical channel in the UDP mode, and store the information about the logical channel type.

S202: The LMP entity of NE A constructs a test message packet which includes the Verify_ID allocated by NE B and the Ethernet data interface ID, and transfers the test message packet to the local packet control module.

S203: The NE A packet control module encapsulates the test message packet into a UDP packet which carries the test message packet by using the IP protocol stack function according to the logical channel type of the UDP mode determined through negotiation, transfers the UDP packet to the PPP interface corresponding to the local Ethernet data interface ID, and transfers the UDP packet through the Ethernet physical link connected with the PPP interface.

It is worthy of attention that because the UDP mode is determined through negotiation, the foregoing text describes the encapsulation and transfer processes from the perspective of lower-layer protocol stack operation. From the perspective of upper-layer system invocation of the protocol stack, NE A and NE B need to create a socket descriptor beforehand. The socket descriptor is correlated with the multicast IP address 224.0.0.1. After the internal UDP port of the NE is set to 1111, the test message packet is transferred from the LMP entity to the transmitting interface of the NE by invoking the socket system.

As mentioned above, the optical/electrical interface IDs correspond to the Ethernet data interface IDs, and also correspond to the PPP interface IDs. Therefore, the optical/electrical interface ID may be obtained according to the corresponding Ethernet data interface ID, and then the PPP interface ID may be obtained according to the optical/electrical interface ID.

S204: The PPP interface of NE B connected with the Ethernet physical link identifies that the UDP packet carries the test message packet, and receives the UDP packet. The NE B packet control module obtains the protocol stack packet from the PPP interface of NE B by using the IP protocol stack function, and then decapsulates the protocol stack packet.

S205: The packet control module of NE B transfers the test message packet obtained after decapsulation to the local LMP entity. The local LMP entity obtains the corresponding local TE link ID and the local Ethernet data interface ID according to the PPP interface that receives the UDP packet, extracts the Verify_ID and the NE A Ethernet data interface ID from the test message packet obtained after decapsulation, correlates the local TE link ID with the TE link ID of NE A according to the stored information about correlation between the Verify_ID and the TE link ID of NE A, correlates the local Ethernet data interface with the Ethernet data interface of NE A, and stores the correlation information. At this time, the test message is transferred successfully.

As mentioned above, the optical/electrical interface IDs correspond to the Ethernet data interface IDs, and also correspond to the PPP interface IDs. Therefore, the optical/electrical interface ID may be obtained according to the corresponding PPP interface, and then the Ethernet data interface ID may be obtained according to the optical/electrical interface ID.

Embodiment 3

Embodiment 3 is detailed below, supposing that the logical channel is provided in the VLAN mode.

The logical channel of the test message is provided in the VLAN mode. At the time of sending the test message packet, the corresponding VLAN tag is affixed. At the time of receiving the packet, the corresponding test message packet is identified according to the VLAN tag. The value of the VLAN tag is selected by the NE which receives the BeginVerify message through negotiation. In the parameter information carried in the negotiation message in third embodiment, a second subcategory of a new ninth category is defined by extending the BEGIN_VERIFY_ACK object, and the VLAN tag carried in the object is defined. The types of VLAN tags include the C-VLAN tag used by the customers, and the S-VLAN tag used by the operators. Moreover, the format of the test message packet that carries the VLAN is not limited to the formats described in the third embodiment of the present disclosure. The BEGIN_VERIFY_ACK object is further described below:

BEGIN_VERIFY_ACK object
Class = 9
C-TYPE = 2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       VerifyDeadInterval      |   Verify_Transport_Response   |
+-+-+-+-+-+-+-+-+-+-+-+-+-+-+-+-+-+-+-+-+-+-+-+-+-+-+-+-+-+-+-+-+
|         VLAN tag type         |      Res      |    VLAN tag   |
+-+-+-+-+-+-+-+-+-+-+-+-+-+-+-+-+-+-+-+-+-+-+-+-+-+-+-+-+-+-+-+-+
```

VLAN tag Type: type of VLAN tag;
Example
0x8810: C-VLAN tag used by the customer;
0x88a8: S-VLAN tag used by the operator; and
VLAN tag: VLAN tag used for transferring test message packets.

It is worthy of attention that use of the VLAN mode for negotiation depends on support of the Verify Transport Response. If the Verify Transport Response indicates that the VLAN mode is supported, the packet control modules of the sender NE and receiver NE use the VLAN tag which identifies the test message packet. That is, the NE which initiates negotiation (namely, the NE which sends the Begin Verify message) uses the VLAN tag to send the test message packet; the NE which responds to the negotiation (namely, the NE which sends the Begin Verify Ack message) uses the VLAN tag to receive the test message packet. If the Verify Transport Response indicates that the VLAN mode is not supported, the value of the VLAN tag is set to 0.

Figure 3:
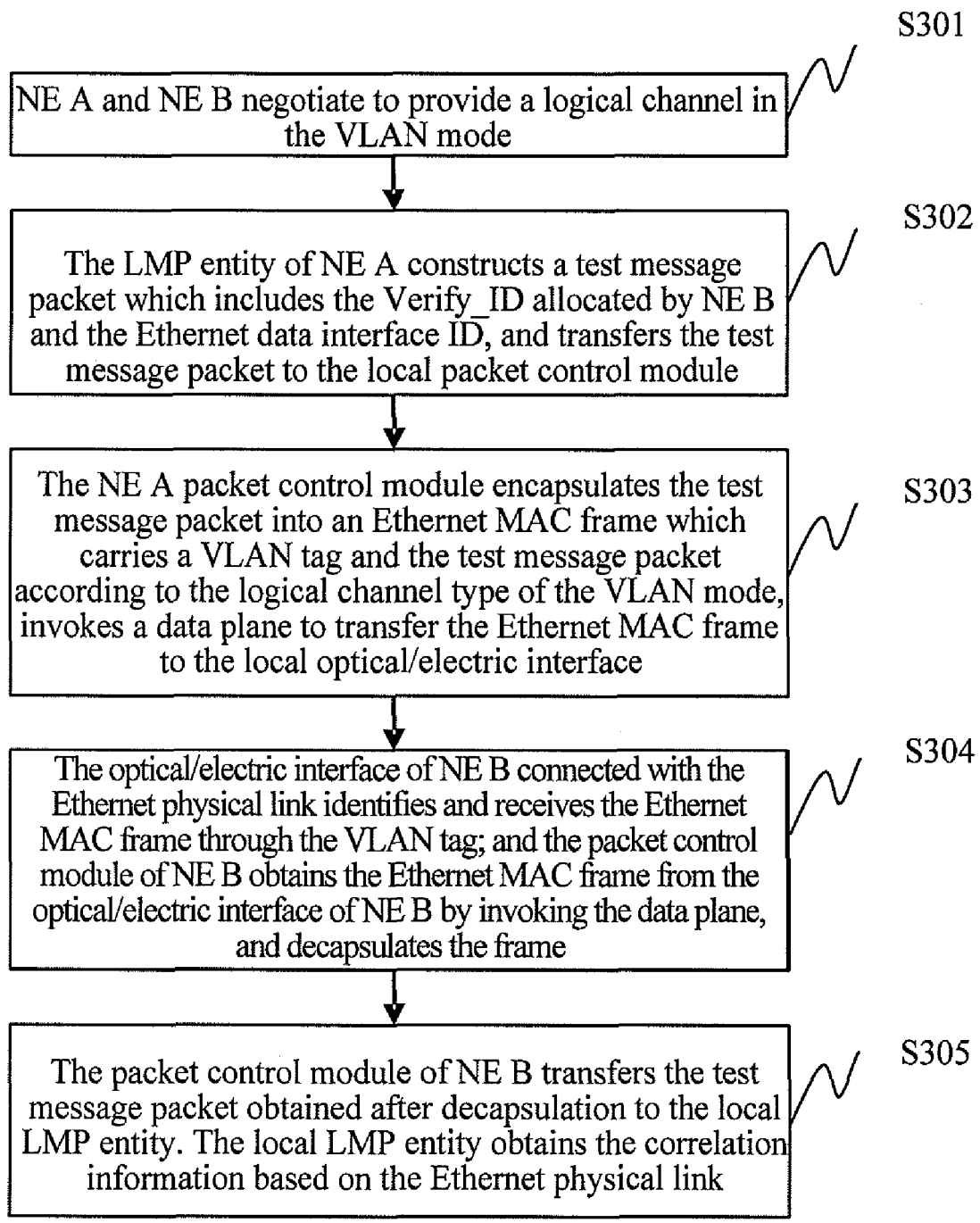
FIG. 3 is another flowchart of a method for transferring test messages in the third embodiment of the present disclosure.

FIG. 3 is a flowchart of another method for transferring test messages in the third embodiment of the present disclosure.

S301: NE A and NE B negotiate to provide a logical channel in the VLAN mode, and store the information about the logical channel type.

S302: The LMP entity of NE A constructs a test message packet which includes the Verify_ID allocated by NE B and the Ethernet data interface ID, and transfers the test message packet to the local packet control module.

S303: The NE A packet control module encapsulates the test message packet into an Ethernet MAC frame which carries a VLAN tag and the test message packet according to the logical channel type of the VLAN mode determined through negotiation, invokes a data plane to transfer the Ethernet MAC frame to an optical/electrical interface corresponding to the local Ethernet data interface, and transfers the Ethernet MAC frame through the Ethernet physical link connected with the optical/electrical interface.

Here, the destination MAC address of the packet is freely configurable, and the source MAC address may be set to any MAC address of the local NE.

Therefore, because the optical/electrical interface IDs correspond to the Ethernet data interface IDs, an optical/electrical interface ID may be obtained according to the Ethernet data interface ID.

S304: The NE B optical/electrical interface connected with the Ethernet physical link identifies the Ethernet MAC frame according to the VLAN tag, and therefore, determines that the Ethernet MAC frame carries the test message packet. Afterwards, the NE B optical/electrical interface receives the Ethernet MAC frame. The NE B packet control module invokes a data plane to obtain the Ethernet MAC frame from the NE B optical/electrical interface, and decapsulates the Ethernet MAC frame.

S305: The packet control module of NE B transfers the test message packet obtained after decapsulation to the local LMP entity. The local LMP entity obtains the corresponding local TE link ID and the local Ethernet data interface ID according to the optical/electrical interface that receives the Ethernet MAC frame, extracts the Verify_ID and the NE A Ethernet data interface ID from the test message packet obtained after decapsulation, correlates the local TE link ID with the TE link ID of NE A according to the stored information about correlation between the Verify_ID and the TE link ID of NE A, correlates the local Ethernet data interface with the Ethernet data interface of NE A, and stores the correlation information. At this time, the test message is transferred successfully.

Embodiment 4

Embodiment 4 is detailed below, supposing that the logical channel is provided in the special MAC address mode.

The logical channel for transferring test messages is provided through a preconfigured special MAC address. At the time of sending a test message packet, the special MAC address is used as a destination MAC address. At the time of receiving the packet, the test message packet is identified according to the special MAC address. The special MAC address is user-definable, for example, set to 01-80-C2-00-11-11; or may be an existing special MAC address, for example, an MAC address defined by the 802.3ah; or may be an MAC address defined by the Link Layer Discovery Protocol (LLDP).

Figure 4:
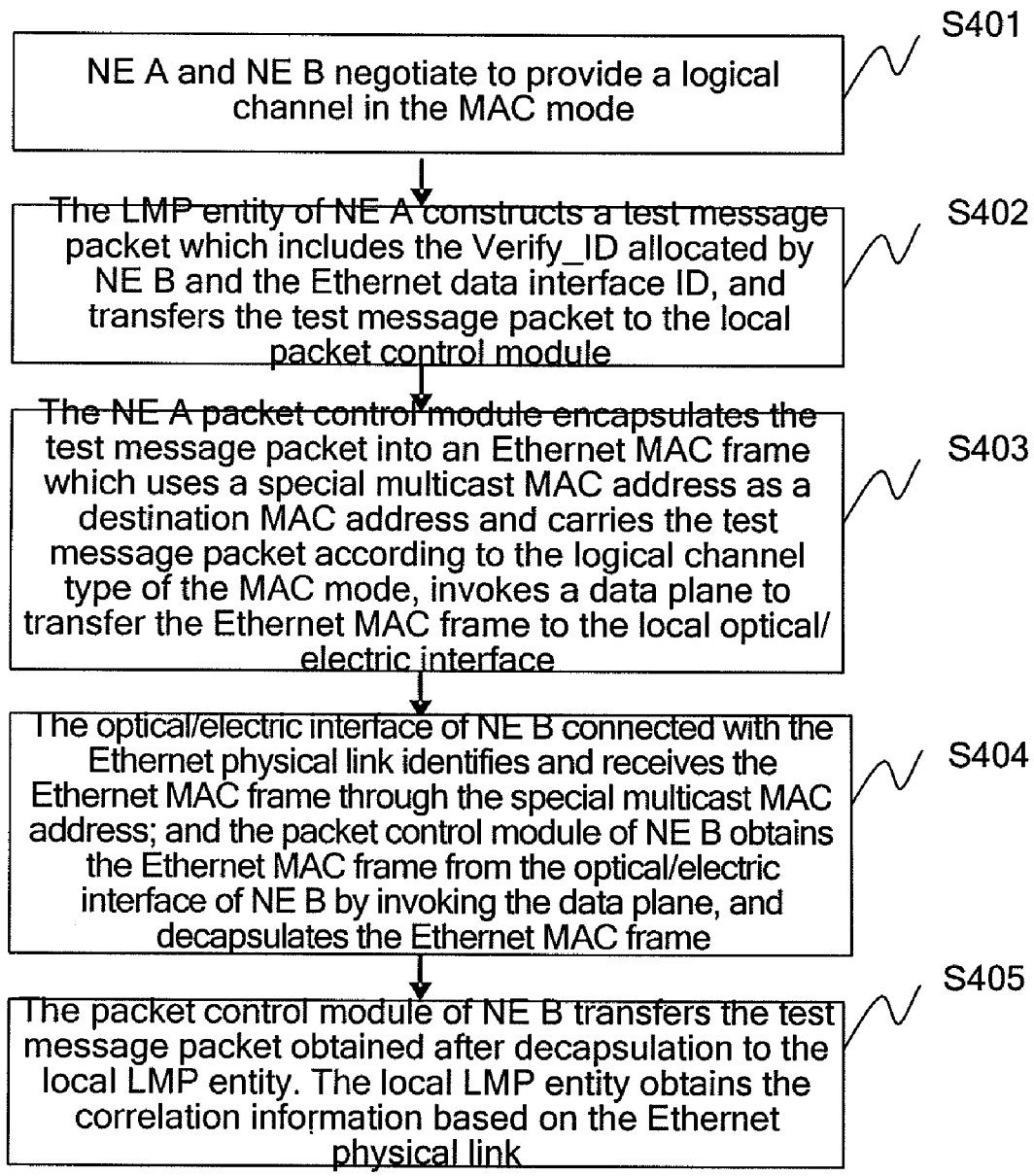
FIG. 4 is another flowchart of a method for transferring test messages in the fourth embodiment of the present disclosure.

FIG. 4 is a flowchart of another method for transferring test messages in the fourth embodiment of the present disclosure.

S401: NE A and NE B negotiate to provide a logical channel in the special MAC address mode, and store the information about the logical channel type.

S402: The LMP entity of NE A constructs a test message packet which includes the Verify_ID allocated by NE B and the Ethernet data interface ID, and transfers the test message packet to the local packet control module.

S403: The NE A packet control module encapsulates the test message packet into an Ethernet MAC frame which uses a special multicast MAC address as a destination MAC address and carries the test message packet according to the logical channel type of the special MAC address mode determined through negotiation, invokes a data plane to transfer the Ethernet MAC frame to an optical/electrical interface corresponding to the local Ethernet data interface, and transfers the Ethernet MAC frame through the Ethernet physical link connected with the optical/electrical interface.

S404: The NE B optical/electrical interface connected with the Ethernet physical link identifies the Ethernet MAC frame according to the special multicast MAC address, and therefore, determines that the Ethernet MAC frame carries the test message packet. Afterwards, the NE B optical/electrical interface receives the Ethernet MAC frame. The NE B packet control module invokes a data plane to obtain the Ethernet MAC frame from the NE B optical/electrical interface, and decapsulates the Ethernet MAC frame.

S405: The packet control module of NE B transfers the test message packet obtained after decapsulation to the local LMP entity. The local LMP entity obtains the corresponding local TE link ID and the local Ethernet data interface ID according to the optical/electrical interface that receives the Ethernet MAC frame, extracts the Verify_ID and the NE A Ethernet data interface ID from the test message packet obtained after decapsulation, correlates the local TE link ID with the TE link ID of NE A according to the stored information about correlation between the Verify_ID and the TE link ID of NE A, correlates the local Ethernet data interface with the Ethernet data interface of NE A, and stores the correlation information. At this time, the test message is transferred successfully.

Embodiment 5

Figure 5:
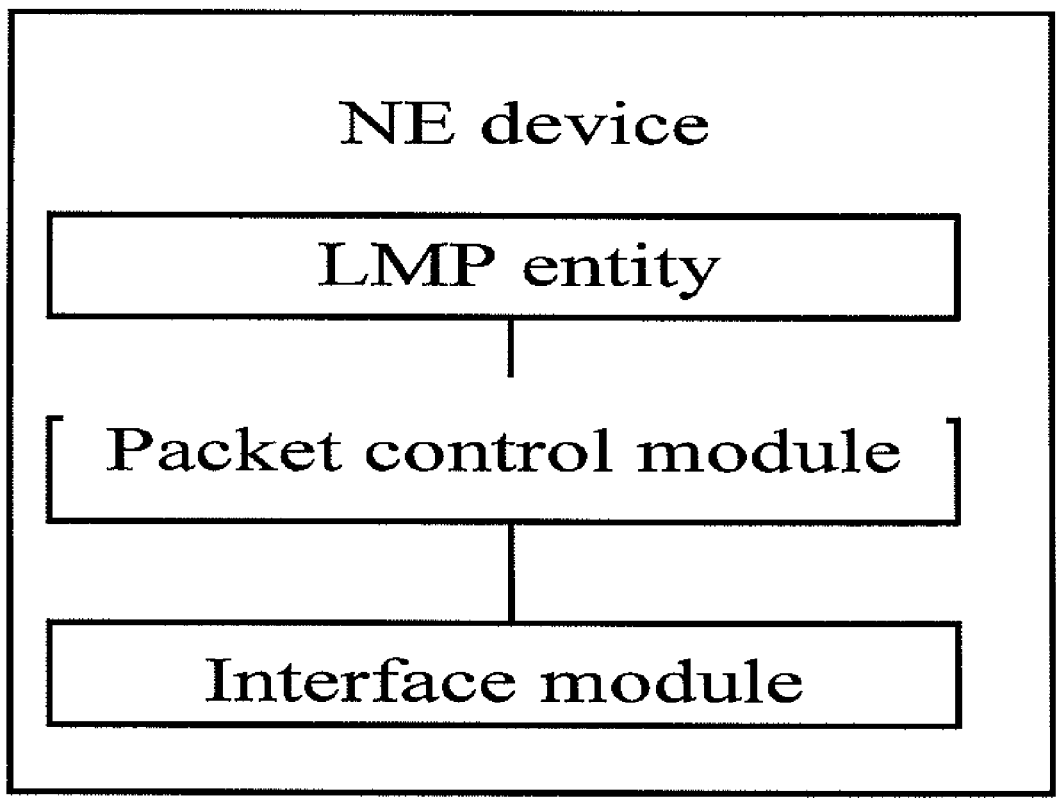
FIG. 5 shows an NE device in the fifth embodiment of the present disclosure.

FIG. 5 shows an NE device in the fifth embodiment of the present disclosure. The NE device includes:

an LMP entity, adapted to: negotiate and select a logical channel type; construct a test message packet which carries a configured Verify_ID and a local Ethernet data interface ID, and send the test message packet to the packet control module; receive the test message packet obtained after decapsulation from the packet control module;

a packet control module, adapted to: receive the test message packet from the LMP entity, encapsulate the test message packet according to the logical channel type determined through negotiation, and send the encapsulated packet which carries the test message packet to the interface module corresponding to the local Ethernet data interface ID; obtain the packet from the interface module, and decapsulate the packet to obtain the test message packet; and an interface module, adapted to: receive the packet from the packet control module, and send the packet to the outside; identify and receive the packet from the outside.

The logical channel types include protocol stack mode, VLAN mode, and special MAC address mode.

In the embodiments of the present disclosure, the LMP entity supports the negotiation mechanism, and may select the type of the logical channel, for example, logical channel of the protocol stack mode, logical channel of the VLAN mode, and logical channel of the special MAC address mode; the packet control module of the NE device encapsulates the test message packet according to the logical channel type determined through negotiation. Therefore, the test message can be transferred on the Ethernet data interface, and the NE device is capable of discovering Ethernet links automatically. Moreover, the foregoing types of logical channels may be negotiated according to the actual application conditions, and the available logical channel may be selected flexibly so that the test message may be transferred between the NE devices more conveniently. When the three embodiments are compared, the second embodiment is characterized by fast and simple implementation, but requires support of the IP protocol stack, and is not applicable if the IP protocol stack is unaware of the Ethernet data interface; the third and fourth embodiments of the present disclosure are characterized by independence of the IP protocol stack, but the third embodiment needs to occupy the VLAN tag, which reduces the available VLAN tags.

Although the disclosure has been described through some exemplary embodiments, the disclosure is not limited to such embodiments. It is apparent that those skilled in the art can make various modifications and variations to the disclosure without departing from the spirit and scope of the disclosure. The disclosure is intended to cover the modifications and variations provided that they fall in the scope of protection defined by the following claims or their equivalents.

What is claimed is:

1. A method for transferring test messages, wherein a first Network Element (NE) is connected with a second NE through an Ethernet physical link, and the method comprises:
   negotiating and determining by the first NE and the second NE a logical channel type;
   constructing, by a Link Management Protocol (LMP) entity of the first NE, a test message packet which carries an Ethernet data interface ID of the first NE; and transferring the test message packet to a packet control module of the first NE, wherein the test message packet further carries a Verify_ID allocated by the second NE;
   encapsulating, by the packet control module of the first NE, the test message packet according to the logical channel type determined through negotiation and transferring the encapsulated packet which carries the test message packet to a transmitting interface corresponding to the Ethernet data interface ID of the first NE;
   identifying and receiving by a receiving interface of the second NE connected with the Ethernet physical link the packet, obtaining by a packet control module of the second NE the packet from the receiving interface of the second NE, and decapsulating the packet;
   transferring by the packet control module of the second NE the test message packet obtained after decapsulation to a LMP entity of the second NE;
   obtaining by the LMP entity of the second NE a Traffic Engineering (TE) link ID of the second NE and an Ethernet data interface ID of the second NE according to the receiving interface, extracting information in the test message packet, obtaining the Ethernet data interface ID of the first NE, and obtaining a TE link ID of the first NE according to the Verify_ID; and
   correlating the TE link ID of the second NE with the TE link ID of the first NE, correlating the Ethernet data interface of the second NE with the Ethernet data interface of the first NE, and saving correlation information.

2. The method for transferring test messages according to claim 1, wherein the determining the logical channel type comprises:
   determining the logical channel type by defining a Verify Transport Mechanism field in a BEGIN_VERIFY object.

3. The method for transferring test messages according to claim 1, wherein the logical channel type comprises a protocol stack mode, a Virtual Local Area Network (VLAN) mode, or a special Media Access Control (MAC) address mode.

4. The method for transferring test messages according to claim 3, wherein the protocol stack mode is subdivided into: User Datagram Protocol (UDP) mode and Transmission Control Protocol (TCP) mode.

5. The method for transferring test messages according to claim 3, wherein when the first NE and the second NE negotiate to provide a logical channel in the protocol stack mode:
   the encapsulating the test message packet according to the logical channel type determined through negotiation and transferring the encapsulated packet which carries the test message packet to a transmitting interface corresponding to the Ethernet data interface ID of the first NE comprises:
      encapsulating by the packet control module of the first NE the test message packet into a protocol stack packet which carries the test message packet by using an Internet Protocol (IP) protocol stack function according to the logical channel type of the protocol stack mode and transferring the protocol stack packet to a Point-to-Point Protocol (PPP) interface corresponding to the Ethernet data interface ID of the first NE; and
   the identifying and receiving the packet, and obtaining the packet from the receiving interface of the second NE, and decapsulating the packet comprises:
      identifying and receiving by a PPP interface of the second NE connected with the Ethernet physical link the protocol stack packet and obtaining by the packet control module of the second NE the protocol stack packet from the PPP interface of the second NE by using the IP protocol stack function.

6. The method for transferring test messages according to claim 3, wherein when the first NE and the second NE negotiate to provide the logical channel in the VLAN mode:
   the encapsulating the test message packet according to the logical channel type determined through negotiation and transferring the encapsulated packet which carries the test message packet to a transmitting interface corresponding to the Ethernet data interface ID of the first NE comprises:
      encapsulating by the packet control module of the first NE the test message packet into an Ethernet MAC frame which carries a VLAN tag and the test message packet according to the logical channel type of the VLAN mode, and invoking a data plane to transfer the Ethernet MAC frame to an optical/electrical interface corresponding to the Ethernet data interface ID of the first NE; and
   the identifying and receiving the packet, obtaining the packet from the receiving interface of the second NE, and decapsulating the packet comprises:
      identifying and receiving by an optical/electrical interface of the second NE connected with the Ethernet physical link the Ethernet MAC frame through the VLAN tag, and obtaining by the packet control module of the second NE the Ethernet MAC frame from the optical/electrical interface of the second NE by invoking the data plane.

7. The method for transferring test messages according to claim 6, wherein the VLAN tag affixed to the test message packet is determined by extending a new BEGIN_VERIFY_ACK object.

8. The method for transferring test messages according to claim 3, wherein when the first NE and the second NE negotiate to provide the logical channel in the MAC address mode,
the encapsulating the test message packet according to the logical channel type determined through negotiation and transferring the encapsulated packet which carries the test message packet to a transmitting interface corresponding to the Ethernet data interface ID of the first NE comprises:
encapsulating by the packet control module of the first NE the test message packet into an Ethernet MAC frame which uses a special multicast MAC address as a destination MAC address and carries the test message packet according to the logical channel type of the special MAC address mode, and invoking a data plane to transfer the Ethernet MAC frame to an optical/electrical interface corresponding to the Ethernet data interface ID of the first NE; and
the identifying and receiving the packet, obtaining the packet from the receiving interface of the second NE, and decapsulating the packet comprises:
identifying and receiving by the optical/electrical interface of the second NE connected with the Ethernet physical link, the Ethernet MAC frame through the special multicast MAC address, and obtaining by the packet control module of the second NE the Ethernet MAC frame from the optical/electrical interface of the second NE by invoking the data plane.

9. A method for transferring test messages, wherein a first Network Element (NE) is connected with a second NE through an Ethernet physical link, and the method comprises:
negotiating and determining, by the first NE and the second NE, a logical channel type supported by the first NE and the second NE; wherein the logical channel type is selected from a group of logical channel types comprising a protocol stack mode, a Virtual Local Area Network (VLAN) mode, and a special Media Access Control (MAC) address mode;
constructing, by a Link Management Protocol (LMP) entity of the first NE, a test message packet which carries an Ethernet data interface IDentity (ID) of the first NE, and transferring the test message packet to a packet control module of the first NE;
encapsulating, by the packet control module of the first NE, the test message packet according to the logical channel type determined through negotiation, and transferring the encapsulated packet which carries the test message packet to a transmitting interface corresponding to the Ethernet data interface ID of the first NE;
identifying and receiving, by a receiving interface of the second NE connected with the Ethernet physical link, the packet; and obtaining, by a packet control module of the second NE, the packet from the receiving interface of the second NE, and decapsulating the packet; and
transferring, by the packet control module of the second NE, the test message packet obtained after decapsulation to a LMP entity of the second NE;
wherein:
the test message packet constructed by the LMP entity of the first NE further carries a Verify_ID allocated by the second NE; and
after the LMP entity of the first NE receives the test message packet, the method further comprises:
obtaining by the LMP entity of the second NE a corresponding Traffic Engineering (TE) link ID of the second NE and the Ethernet data interface ID of the second NE according to the receiving interface, extracting information in the test message packet, obtaining the Ethernet data interface ID of the first NE, and obtaining a TE link ID of the first NE according to the Verify_ID.

10. The method for transferring test messages according to claim 9, wherein:
after the second NE obtains information about a local NE and the first NE based on the Ethernet physical link, the method further comprises:
correlating the TE link ID of the second NE with the TE link ID of the first NE, correlating an Ethernet data interface of the second NE with an Ethernet data interface of the first NE, and saving correlation information.

11. A method for transferring test messages, wherein a first Network Element (NE) is connected with a second NE through an Ethernet physical link, and the method comprises:
negotiating and determining, by the first NE and the second NE, a logical channel type supported by the first NE and the second NE; wherein the logical channel type is selected from a group of logical channel types comprising a protocol stack mode, a Virtual Local Area Network (VLAN) mode, and a special Media Access Control (MAC) address mode;
constructing, by a Link Management Protocol (LMP) entity of the first NE, a test message packet which carries an Ethernet data interface IDentity (ID) of the first NE, and transferring the test message packet to a packet control module of the first NE;
encapsulating, by the packet control module of the first NE, the test message packet according to the logical channel type determined through negotiation, and transferring the encapsulated packet which carries the test message packet to a transmitting interface corresponding to the Ethernet data interface ID of the first NE;
identifying and receiving, by a receiving interface of the second NE connected with the Ethernet physical link, the packet; and obtaining, by a packet control module of the second NE, the packet from the receiving interface of the second NE, and decapsulating the packet; and
transferring, by the packet control module of the second NE, the test message packet obtained after decapsulation to a LMP entity of the second NE;
wherein when the first NE and the second NE negotiate to provide the logical channel in the VLAN mode:
the encapsulating the test message packet according to the logical channel type determined through negotiation and transferring the encapsulated packet which carries the test message packet to a transmitting interface corresponding to the Ethernet data interface ID of the first NE comprises:
encapsulating by the packet control module of the first NE the test message packet into an Ethernet MAC frame which carries a VLAN tag and the test message packet according to the logical channel type of the VLAN mode, and invoking a data plane to transfer the Ethernet MAC frame to an optical/electrical interface corresponding to the Ethernet data interface ID of the first NE; and
the identifying and receiving the packet, obtaining the packet from the receiving interface of the second NE, and decapsulating the packet comprises:
identifying and receiving by an optical/electrical interface of the second NE connected with the Ethernet physical link the Ethernet MAC frame through the VLAN tag, and obtaining by the packet control module of the second NE the Ethernet MAC frame from the optical/electrical interface of the second NE by invoking the data plane.

12. The method for transferring test messages according to claim 11, wherein:
when the first NE and the second NE negotiate to provide a logical channel in the protocol stack mode:
the encapsulating the test message packet according to the logical channel type determined through negotiation and transferring the encapsulated packet which carries the test message packet to a transmitting interface corresponding to the Ethernet data interface ID of the first NE comprises:
encapsulating by the packet control module of the first NE the test message packet into a protocol stack packet which carries the test message packet by using an Internet Protocol (IP) protocol stack function according to the logical channel type of the protocol stack mode and transferring the protocol stack packet to a Point-to-Point Protocol (PPP) interface corresponding to the Ethernet data interface ID of the first NE; and
the identifying and receiving the packet, and obtaining the packet from the receiving interface of the second NE, and decapsulating the packet comprises:
identifying and receiving by a PPP interface of the second. NE connected with the Ethernet physical link the protocol stack packet and obtaining by the packet control module of the second NE the protocol stack packet from the PPP interface of the second NE by using the IP protocol stack function;

when the first NE and the second NE negotiate to provide the logical channel in the MAC address mode:
the encapsulating the test message packet according to the logical channel type determined through negotiation and transferring the encapsulated packet which carries the test message packet to a transmitting interface corresponding to the Ethernet data interface ID of the first NE comprises:
encapsulating by the packet control module of the first NE the test message packet into an Ethernet MAC frame which uses a special multicast MAC address as a destination MAC address and carries the test message packet according to the logical channel type of the special MAC address mode, and invoking a data plane to transfer the Ethernet MAC frame to an optical/electrical interface corresponding to the Ethernet data interface ID of the first NE; and
the identifying and receiving the packet, obtaining the packet from the receiving interface of the second NE, and decapsulating the packet comprises:
identifying and receiving by the optical/electrical interface of the second NE connected with the Ethernet physical link, the Ethernet MAC frame through the special multicast MAC address, and obtaining by the packet control module of the second NE the Ethernet MAC frame from the optical/electrical interface of the second NE by invoking the data plane.

* * * * *

UNITED STATES PATENT AND TRADEMARK OFFICE
CERTIFICATE OF CORRECTION

| | | |
|---|---|---|
| PATENT NO. | : 8,094,567 B2 | Page 1 of 1 |
| APPLICATION NO. | : 12/428250 | |
| DATED | : January 10, 2012 | |
| INVENTOR(S) | : Feng Li et al. | |

It is certified that error appears in the above-identified patent and that said Letters Patent is hereby corrected as shown below:

In the Claims

In column 11, claim 1, line 33, after "Ethernet data interface" replace "ID" with --identifier (ID)--.

In column 16, claim 12, line 13, after "the logical channel type" replace "o f" with --of--.

Signed and Sealed this
Twenty-seventh Day of March, 2012

David J. Kappos
*Director of the United States Patent and Trademark Office*